United States Patent
Yui et al.

(10) Patent No.: US 7,224,495 B2
(45) Date of Patent: May 29, 2007

(54) IMAGE READING UNIT AND IMAGE READING APPARATUS USING THE SAME

(75) Inventors: Kenichi Yui, Kofu (JP); Osamu Sumiya, Kofu (JP)

(73) Assignee: Nisca Corporation, Minamikoma-Gun, Yamanashi-Ken (JP)

( * ) Notice: Subject to any disclaimer, the term of this patent is extended or adjusted under 35 U.S.C. 154(b) by 873 days.

(21) Appl. No.: 10/143,846

(22) Filed: May 14, 2002

(65) Prior Publication Data

US 2002/0171880 A1    Nov. 21, 2002

(30) Foreign Application Priority Data

| May 16, 2001 | (JP) | ............................ 2001-146276 |
| May 16, 2001 | (JP) | ............................ 2001-146295 |
| May 16, 2001 | (JP) | ............................ 2001-146316 |

(51) Int. Cl.
  *H04N 1/04*   (2006.01)
  *H04N 1/46*   (2006.01)

(52) U.S. Cl. ...................... 358/474; 358/482; 358/497; 358/505

(58) Field of Classification Search ................ 358/474, 358/482, 497, 505, 513; 257/706, 713
See application file for complete search history.

(56) References Cited

U.S. PATENT DOCUMENTS

| 5,299,031 A |   | 3/1994 | Shindoh et al. |
| 5,920,458 A | * | 7/1999 | Azar ........................... 361/704 |
| 6,067,231 A | * | 5/2000 | Lu ............................... 361/704 |

FOREIGN PATENT DOCUMENTS

| JP | U-S58-118756 | 8/1983 |
| JP | H05-191570   | 7/1993 |
| JP | H07-264354   | 10/1995 |
| JP | H10-210221   | 8/1998 |
| JP | 2000-115458  | 4/2000 |

OTHER PUBLICATIONS

Patent Abstract of Japan, No. 05-268424, Publication Date Oct. 15, 1993, Applicant: Toshiba Corp, Toshiba Inteligent Technol. Ltd.
Patent Abstract of Japan, No. 02-101868, Publication Date Apr. 13, 1990, Applicant: Canon Inc.
Patent Abstract of Japan, No. 2000-002947, Publication Date Jan. 7, 2000, Applicant: Canon Inc.
Patent Abstract of Japan, No. 01-211781, Publication Date Aug. 24, 1989, Applicant: Canon Inc.
Patent Abstract of Japan, No. 05-347685, Publication Date Dec. 27, 1993, Applicant: Fuji Xerox Co., Ltd.
Patent Abstract of Japan, No. 08-032762, Publication Date Feb. 2, 1996, Applicant: Fuji Xerox Co., Ltd.

* cited by examiner

*Primary Examiner*—Jerome Grant
*Assistant Examiner*—Houshang Safaipour
(74) *Attorney, Agent, or Firm*—Manabu Kanesaka

(57) ABSTRACT

An image reading unit includes an image sensor for converting light from a document into an electric signal, and a circuit board provided with the image sensor on one side. In the image reading unit, a heat dissipating member for controlling a temperature of the image sensor is attached to one side of the circuit board, and a shield member for reducing a noise is provided on the other side of the circuit board. The heat dissipating member and the shield member are connected by a heat conductive member. Also, the heat dissipating member is interposed between the image sensor and the circuit board.

9 Claims, 16 Drawing Sheets

IMAGE READING UNIT AND IMAGE READING APPARATUS USING THE SAME

BACKGROUND OF THE INVENTION AND RELATED ART STATEMENT

The present invention relates to an image reading unit and an image reading apparatus using the same. More particularly, the present invention relates to an image reading unit in which a circuit board is provided with an image sensor for reading image data, a heat dissipating member for controlling a temperature of the image sensor is provided on one side of the circuit board, and a shield member for reducing a noise is provided on the other side and connected to the heat dissipating member via a heat conductive member.

As shown in FIG. 16, a conventional image reading apparatus for reading an image on a document with various sizes as image data includes a light source 86 for irradiating light to the document; a plurality of reflecting mirrors 83, 84, 85 for deflecting the light from the document; a condenser lens 87 for condensing the light reflected by the reflecting mirrors 83, 84, 85; and an image sensor 80 for detecting the light from the condenser lens 87. The light detected by the image sensor 80 is subjected to the photoelectric conversion, and then processed as the image data.

The image sensor for converting the received light into an electric signal reads the image with timing in synchronization with a clock signal with a predetermined frequency. Upon reading the image signal from the image sensor, noises in a frequency band including the clock signal frequency and frequencies with an integral multiple of the clock frequency are generated.

Therefore, in order to prevent the noise from leaking outside, for example, as disclosed in Japanese Patent Publication (KOKAI) No. 05-347685 and Japanese Patent Publication (KOKAI) No. 08-32762, a shield cover made of a metal is provided for covering a periphery of a circuit board.

However, the shield cover is provided to cover not only the circuit board to which the image sensor is attached, but also a larger area including a periphery of the circuit board and the lens, resulting in a large shield cover. Thus, there has been an example that the shield cover covers only the circuit board.

In general, as shown in FIG. 16, the image sensor 80 is attached on the circuit board 81 such that a position of the image sensor 80 with respect to an optical axis can be adjusted by screws or the like. Then, the circuit board 81 provided with the image sensor 80 is fixed to a frame 92 disposed in a chassis of an apparatus main body by using a fixing member 90 such that the image sensor can properly receive the light from the condenser lens 87. A screw 91 fixes the circuit board 81 at a proper position with respect to the condenser lens 87. Then, the shield cover 82 covers the circuit board 81 in order to prevent the noise.

Further, since the image sensor is formed of several millions of electric elements arranged on a silicon board to be a large scale integrated circuit (LSI), a large amount of electricity is consumed, and a heat generation rate per unit-hour becomes high. Especially, in recent years, the number of pixels of the sensor in the image reading apparatus has been steadily increased to achieve a higher-density and higher-speed image reading. The clock speed has been also accelerated in order to achieve higher-speed image data transmission. Consequently, as the image sensor generates more heat, a heat sink or heat dissipating plate needs to be attached to an outline package of the image sensor in order to dissipate the heat generated by the image sensor.

Therefore, in the conventional image reading apparatus, it is necessary for the circuit board to separately provide with a fixing and supporting member for attaching the circuit board to a frame of the apparatus main body, a shield cover for preventing the noise from entering the circuit board or shielding an external noise, and a heat dissipating member (a heat sink member) for dissipating the heat. Therefore, the number of parts increases, and a manufacturing operation becomes cumbersome, resulting in a higher manufacturing cost.

Also, a precise positioning is required for attaching the circuit board to the frame of the apparatus main body, so that a cumbersome adjustment operation is required.

The present invention has been made in view of the aforementioned problems, and an object of the invention is to provide an image reading unit and an image reading apparatus using the same, in which an image sensor and a circuit board are attached to a shield member for shielding and dissipating the heat, so that the number of the parts and manufacturing cost can be lowered while a position of the circuit board is easy to adjust.

Further objects and advantages of the invention will be apparent from the following description of the invention.

SUMMARY OF THE INVENTION

To achieve the aforementioned object, the present invention provides an image reading unit including an image sensor for converting light from a document into an electric signal, and a circuit board to which the image sensor is attached. In the image reading unit, a heat dissipating member is disposed on one side of the circuit board to control a temperature of the image sensor, and a shield member is disposed at the other side of the circuit board to reduce an electrical noise. A heat conductive member connects the heat dissipating member and the shield member.

The heat dissipating member is interposed between the image sensor and the circuit board, and a through hole is formed on the circuit board. The heat conductive member is inserted into the through hole of the circuit board to connect the heat dissipating member and the shield member.

The image reading unit includes a mounting section for fixing the shield member, so that the shield member equipped with the image sensor, the heat dissipating member, and the circuit board is attached to the mounting section to freely adjust a position of the shield member.

Further, the present invention provides an image reading apparatus, which includes a light source for irradiating light to a document, an image sensor for converting the light from the document into an electric signal, and a circuit board provided with the image sensor. In the image reading apparatus, a heat dissipating member for controlling a temperature of the image sensor is disposed at one side of the circuit board, and a shield member for reducing an electrical noise is disposed at the other side of the circuit board. Then, the heat dissipating member and the shield member are connected by a heat conductive member.

In the image reading apparatus of the invention, the light source, the image sensor, the heat dissipating member, the circuit board, and the shield member are mounted in an image reading unit moving along the document. Then, the shield member attached with the image sensor, the heat dissipating member and the circuit board is attached to the image reading unit such that a position of the shield member is freely adjustable.

Also, the light source is mounted on a light source unit moving along the document. The image sensor, the heat dissipating member, the circuit board and the shield member are mounted on a stationary supporting member. Then, the shield member attached with the image sensor, the heat dissipating member and the circuit board is attached to the supporting member such that a position of the shield member can be freely adjusted.

Further, a through hole may be formed on the circuit board, and the heat conductive member is inserted into the through hole of the circuit board, to thereby connect the heat dissipating member and the shield member.

BRIEF DESCRIPTION OF THE DRAWINGS

FIG. 11 is a perspective view showing the state that the sensor board equipped with the image sensor is attached to the shield member, as seen from a direction opposite to the direction from which FIG. 9 is seen;

DETAILED DESCRIPTION OF THE PREFERRED EMBODIMENT

Hereunder, embodiments of the invention will be explained with reference to the accompanying drawings.

The present invention provides an image reading unit and an image reading apparatus using the same. The image reading unit is applied to various types of copiers, facsimile machines, image scanners connected to electronic appliances. Embodiments of the invention show an example of the image reading apparatus for a copier. In general, there are three types of image reading apparatus as follows.

In the first type of the image reading apparatus, an image reading unit formed of a lens and an image sensor is fixed to an attaching section of the image reading apparatus. A light source unit and a reflecting mirror unit are moved at a two to one speed ratio along a platen so as to read an image on a document placed on the platen.

In the second type of the image reading apparatus, an image reading unit formed of a light source, reflecting mirrors, a lens and an image sensor is fixed, and reads an image on a document that is moving along a platen.

In the third type of the image reading apparatus, an image reading unit formed of a light source, reflecting mirrors, lens and an image sensor is mounted to a carriage, and the carriage is moved along a platen on which a document is placed.

Firstly, an embodiment in which the present invention is applied to the first type of the image reading apparatus will be explained.

Figure 1:
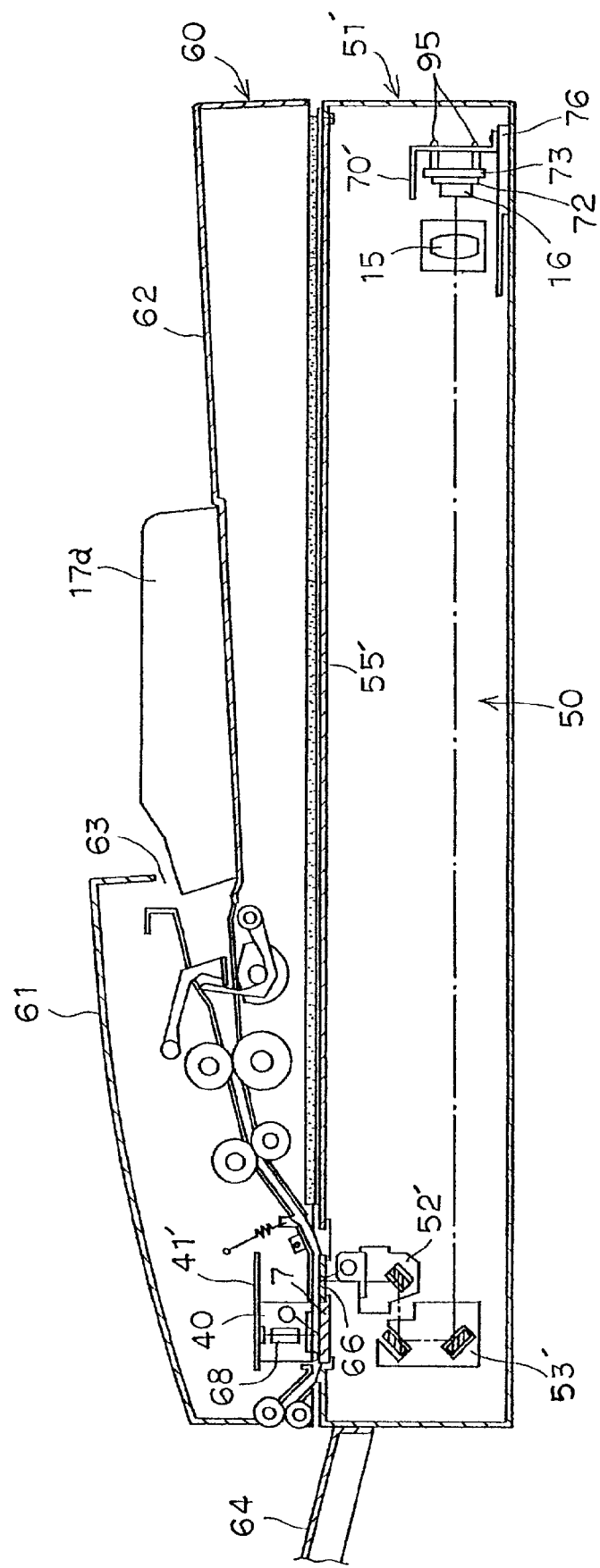
FIG. 1 is a sectional view showing an image reading apparatus according to an embodiment of the present invention.
Figure 2:
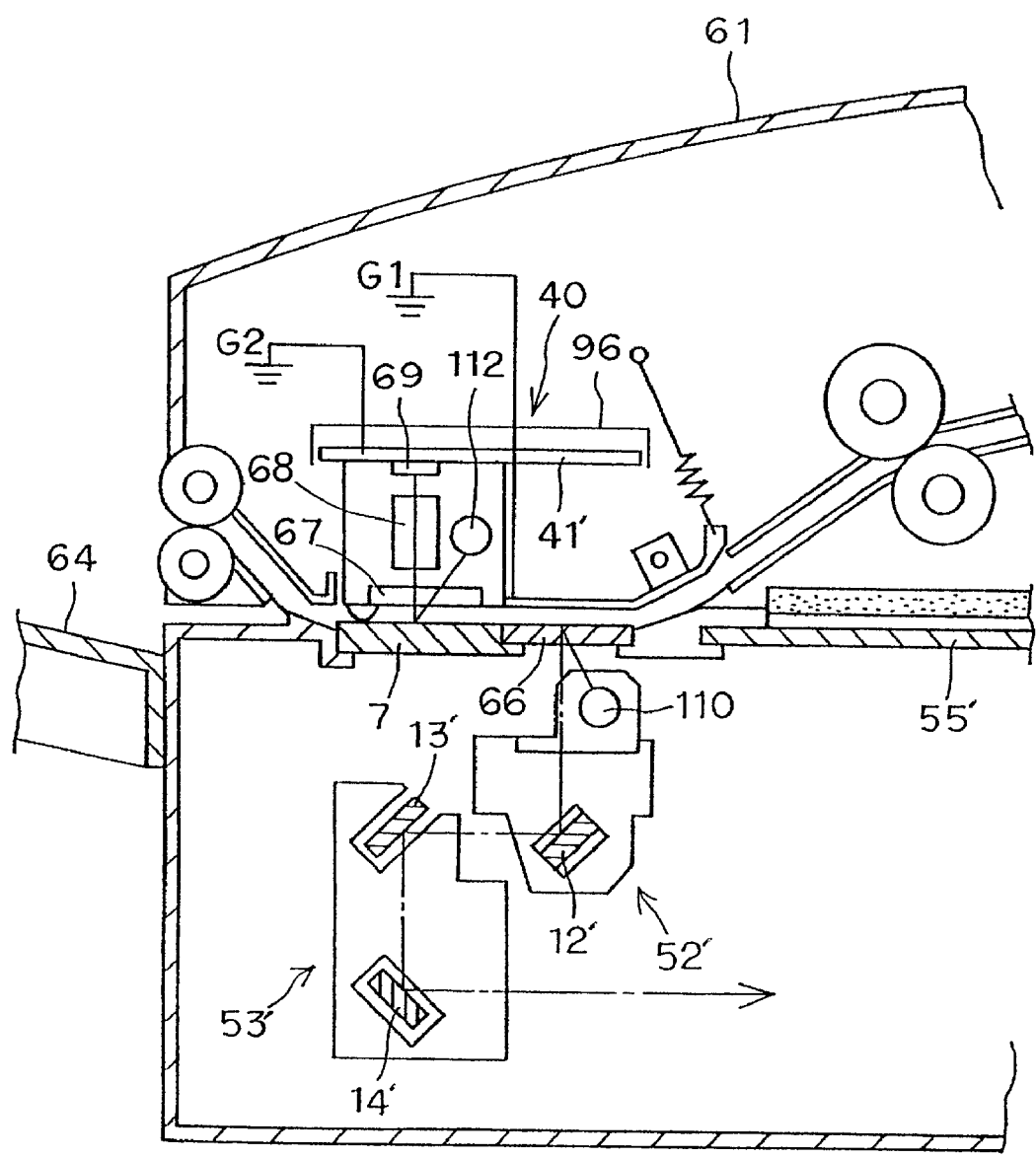
FIG. 2 is an enlarged sectional view showing a portion of a light source as an optical mechanism, a reflecting mirror section as a light deflecting device, and a close contact type image sensor as another optical reading device in the image reading apparatus according to the embodiment of the present invention.

FIG. 1 is a sectional view showing a structure of an image reading apparatus according to an embodiment of the invention. FIG. 2 is an enlarged sectional view showing a portion including a light source 110 as an optical mechanism section of the first image reading section in the image reading apparatus, reflecting mirrors 12', 13', 14' as light deflecting means, and the second optical reading device 40.

Incidentally, the copier according to this embodiment of the invention has a function called ADF (automatic document feeder), for feeding out the document consecutively and supplying the same to the image reading section.

The image reading apparatus includes a lower unit 51' and an upper unit 60 attached to the lower unit 51' by a hinge or the like such that the upper unit 60 is freely capable of opening and closing.

The upper unit 60 includes a housing 61 for accommodating a transfer path in which the document is transferred, a pair of rollers for transferring the document, and the second optical reading device 40 for reading an image on a backside of the document. In the housing 61, a document inlet 63 is formed in correspondence with a sheet supply tray 52, and a document discharge port is formed in correspondence with a sheet discharge tray 64. The document introduced from the document inlet 63 is transferred along the transfer path provided inside the housing, and after a reading process is complete, the document is discharged on the sheet discharge tray 64 through the document discharge port.

Further, the first optical reading device 50 is provided for reading an image on a front side of the document passing along a sheet-through platen 66 provided along the transfer path. The first optical reading device 50 is provided with a reduced optical system sensor, and includes the first carriage 52' and the second carriage 53'. The carriages 52', 53' are driven by a motor, connected with each other to maintain a predetermined distance between them, and moved inside the unit in a right or left direction in FIG. 2.

As shown in FIG. 2, the carriage 52' is equipped with a light source 110 for irradiating light to the document, and the reflecting mirror 12'. The reflecting mirror 12' receives the light from the document and reflects the light in a horizontal direction. Also, the carriage 53' is equipped with the reflecting mirror 13' for reflecting the light from the reflecting mirror 12' toward a vertical direction, and the reflecting mirror 14' for reflecting the light from the reflecting mirror 13' in a horizontal direction opposite to the reflected light from the reflecting mirror 12'.

The first optical reading device 50 fixed inside the lower unit 51' includes a condenser lens 15 for receiving the light from the reflecting mirror 14'; an image sensor 16 for receiving the light focused by the condenser lens 15; a heat sink member 72 for controlling a temperature of the image sensor 16; and a circuit board 73 attached to the image sensor 16 through the heat sink member 72. The light detected by the image sensor 16 is converted into a digital signal by the circuit board 73, and then sent to an interface board inside the copier through a control board that carries out various image processing. The heat sink member 72 and the circuit board 73 are fixed to a shield member 70', which has both the heat sink function and the noise shield function, by a heat conductive member 95. The shield member 70' is fixed to an attaching section 76, to thereby form the image reading unit.

In the embodiment of the invention, the first optical reading device 50 includes a platen (referred to as "book platen" hereinafter) 55'. The book platen 55' is disposed on an upper surface of the lower unit 51' adjacent to the sheet-through platen 66 for placing the documents thereon. The document placed on the book platen 55' is scanned by moving the carriages 52', 53', to thereby read the image on the document.

The carriages 52', 53' are respectively driven by the motor, and interlock with each other to maintain the predetermined distance between them. The carriage 53' moves with one to two ratio to the carriage 52' inside the lower unit 51' in the right or left direction in FIG. 2.

As shown in FIG. 2, in the second optical reading device 40, attached to a shield cover for reducing a noise and integrally fixed to the second optical reading device 40 are a light source 112 for irradiating light for reading an image on the backside (a surface facing upward) of the document transferred in the transfer path; a contact glass 67 through which the light from the light source 112 and the rear surface of the document passes; a SELFOC lens 68 for changing the reflected light into parallel light; a line image sensor 69 for detecting the light through the SELFOC lens 68 and converting the light into an electric signal; and the circuit board 41. The light detected by the image sensor 69 is converted into the digital signal by the circuit board 41, and sent to the interface board inside the copier through the image processing board provided inside the lower unit 51'.

Next, according to another embodiment, an image reading unit 2 and an image reading apparatus of the invention applied to the third type of the image reading apparatus will be explained. As described above, in the third type of the image reading apparatus, the image reading unit 2 formed of a light source, reflecting mirrors, a lens and an image sensor is moved along a platen on which a document is placed to thereby read an image on the document.

Figure 3:
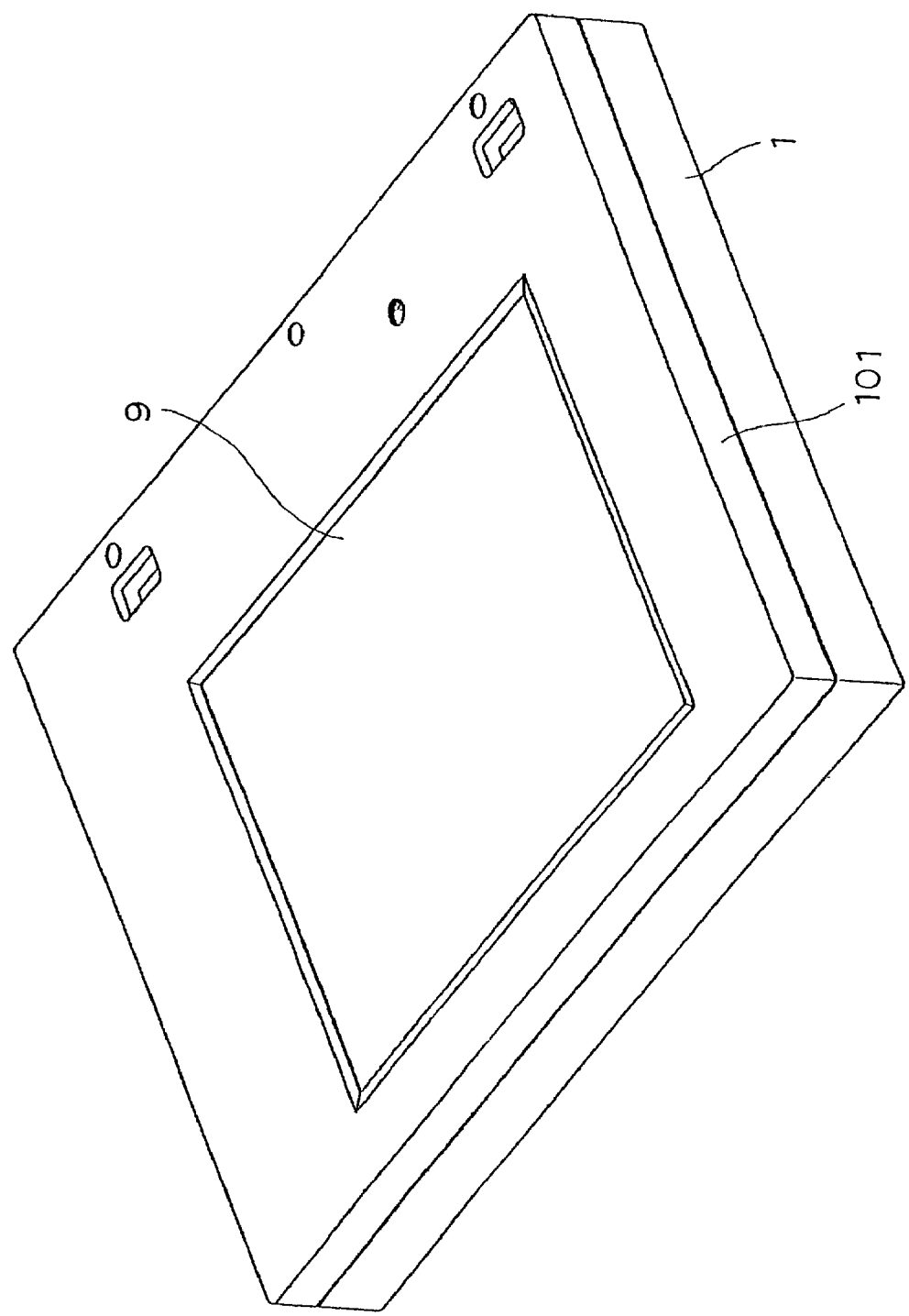
FIG. 3 is a perspective view of an appearance of an image reading apparatus according to another embodiment of the invention, in which a cover member provided with a platen glass for placing a document thereon is attached.
Figure 4:
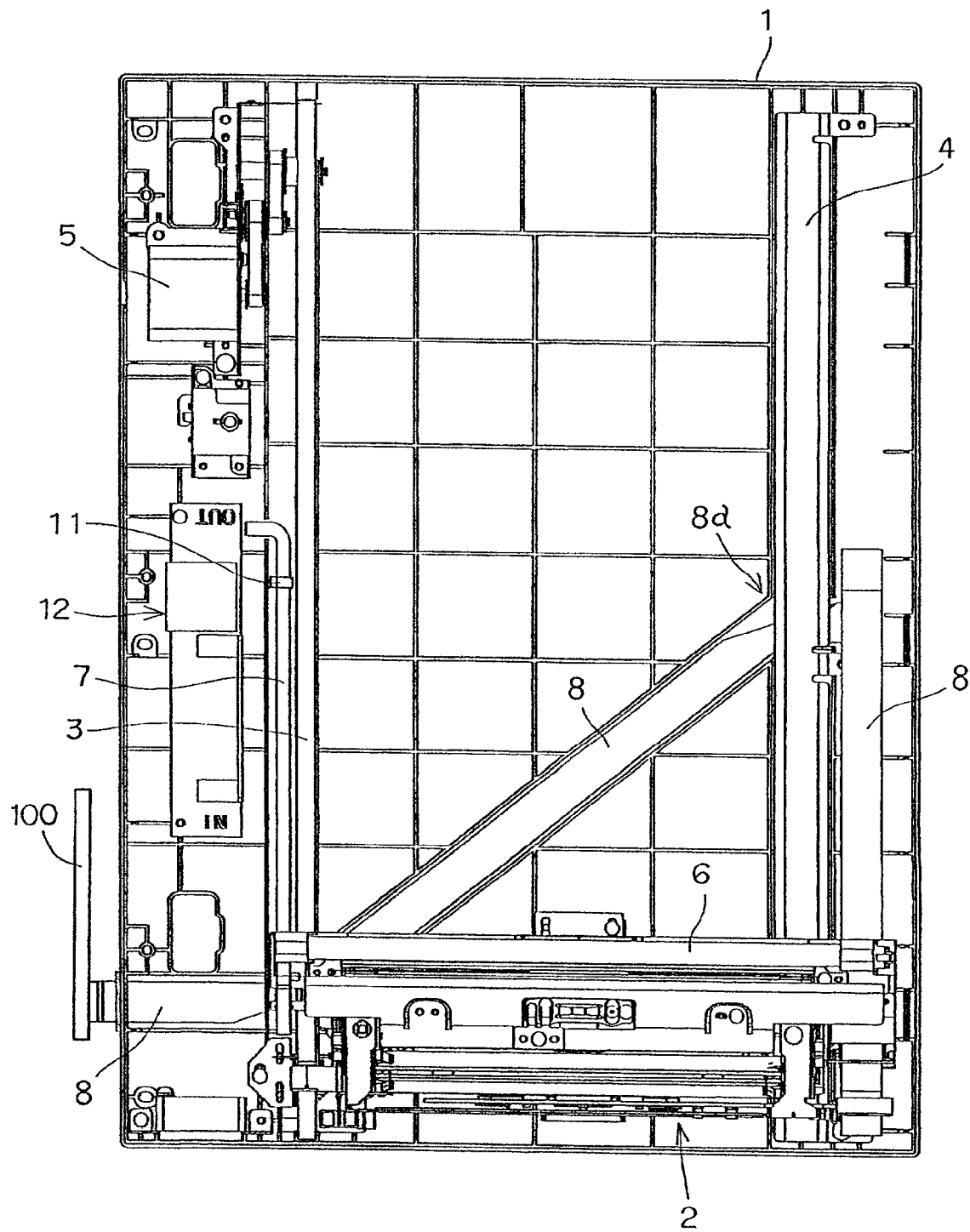
FIG. 4 is a plan view showing an inside of the image reading apparatus in FIG. 3.
Figure 5:
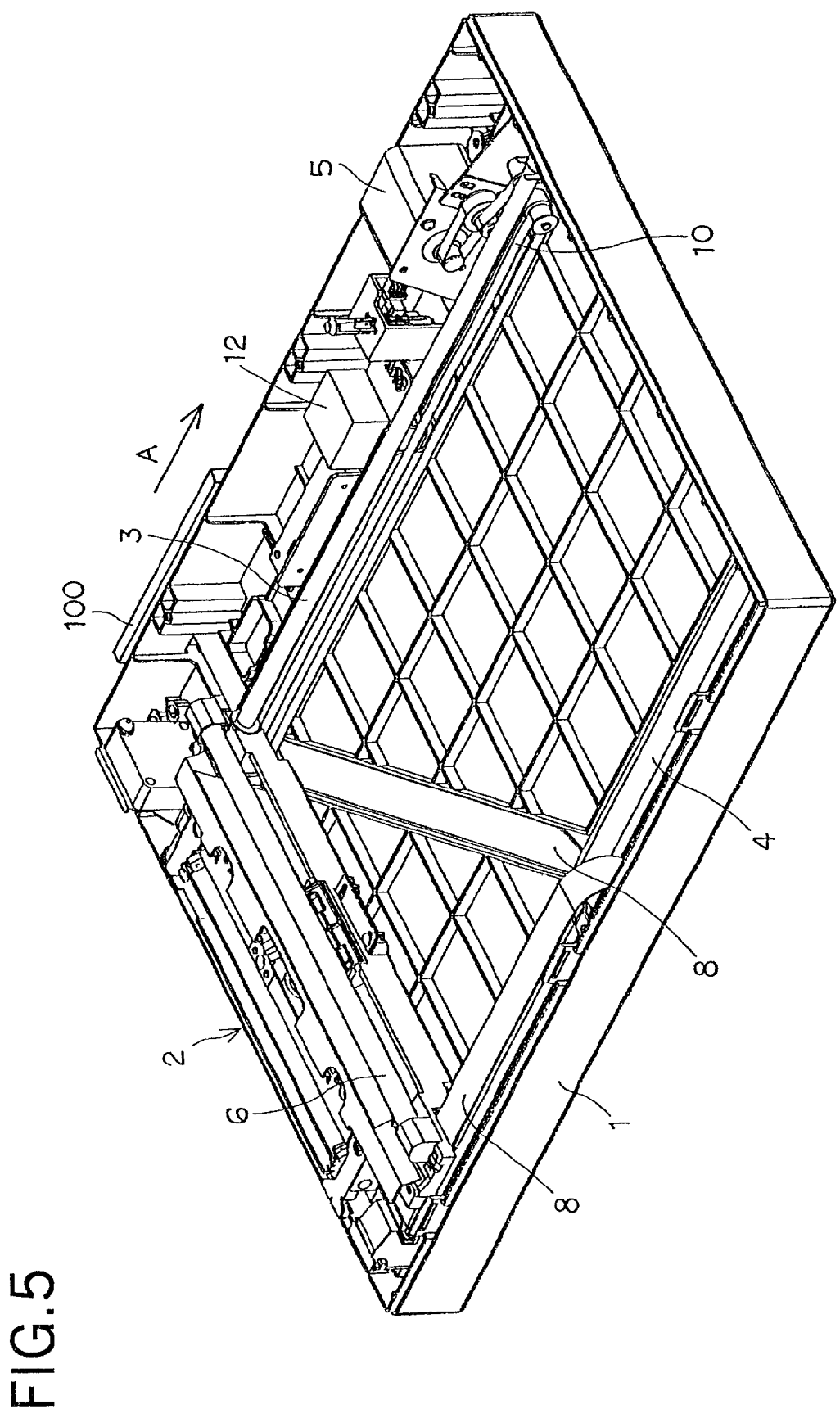
FIG. 5 is a perspective view showing the inside of the image reading apparatus in FIG. 3.
Figure 6:
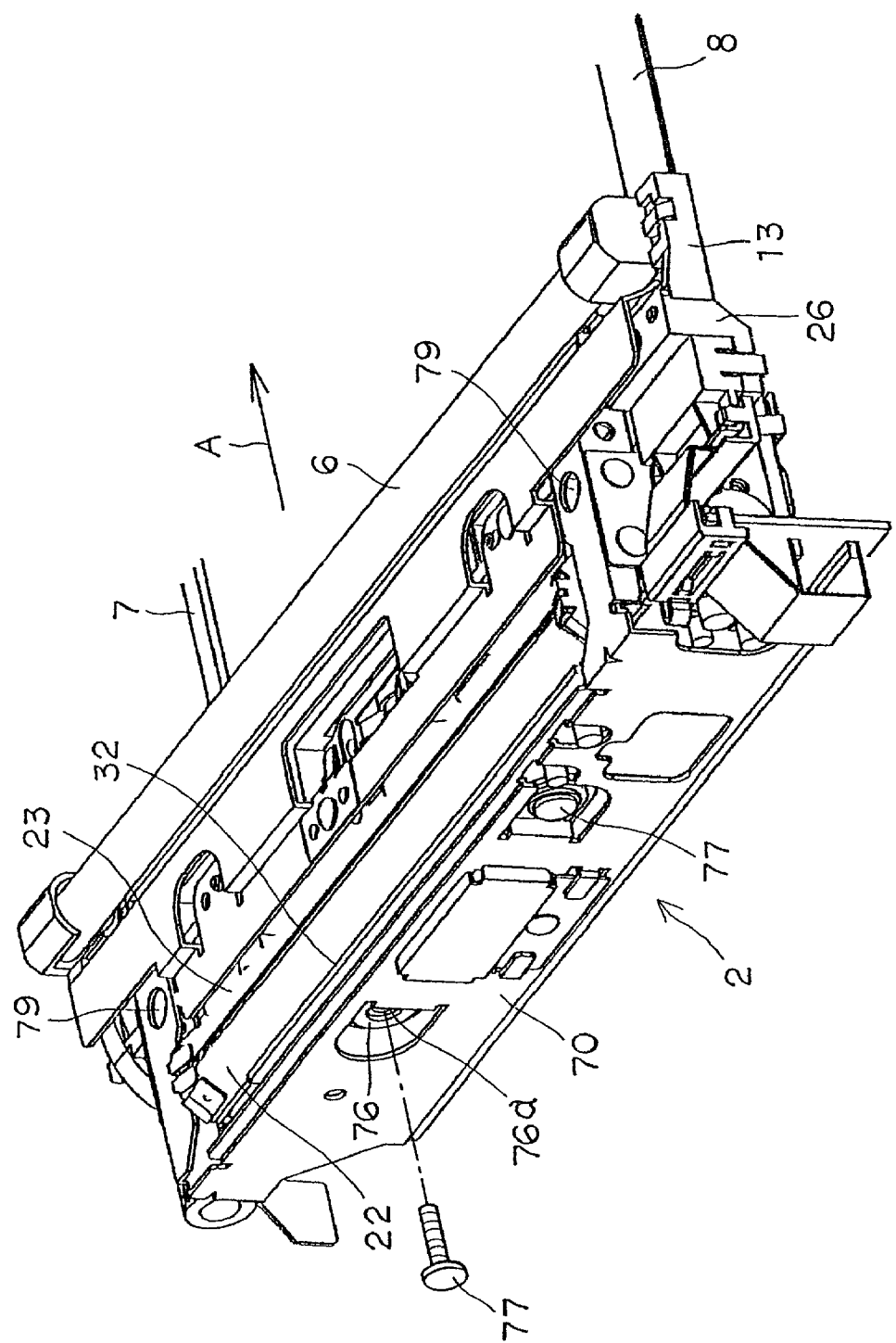
FIG. 6 is a perspective view of an image reading unit in the image reading apparatus shown in FIG. 3, as seen from a rear side thereof when the image reading unit is moving in an approach or forward route for scanning the document.
Figure 7:
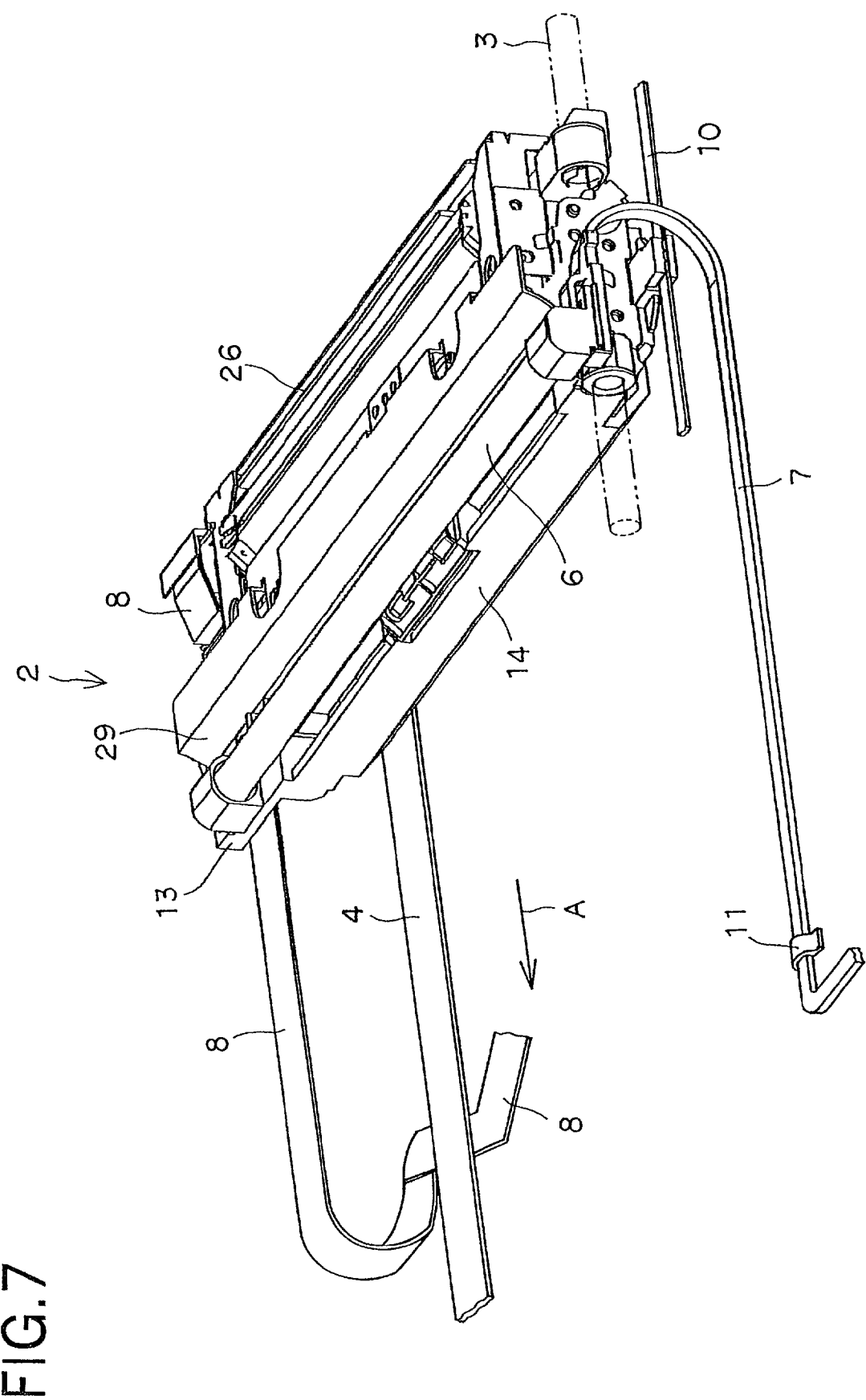
FIG. 7 is another perspective view of the image reading unit in the image reading apparatus shown in FIG. 3, as seen from a front side thereof when the image reading unit is moving in the approach or forward route for scanning the document.
Figure 8:
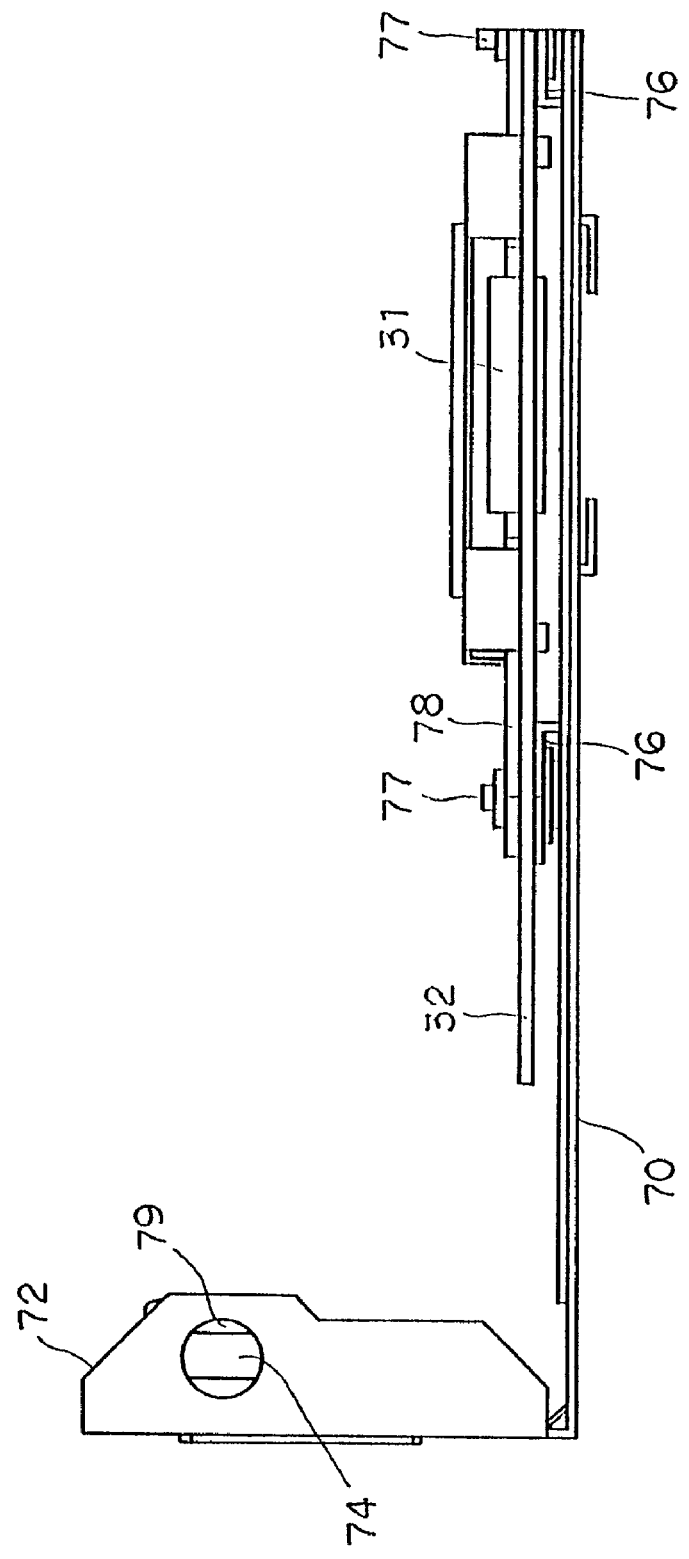
FIG. 8 is a front view showing a state that a sensor board equipped with an image sensor is attached to a shield member.
Figure 9:
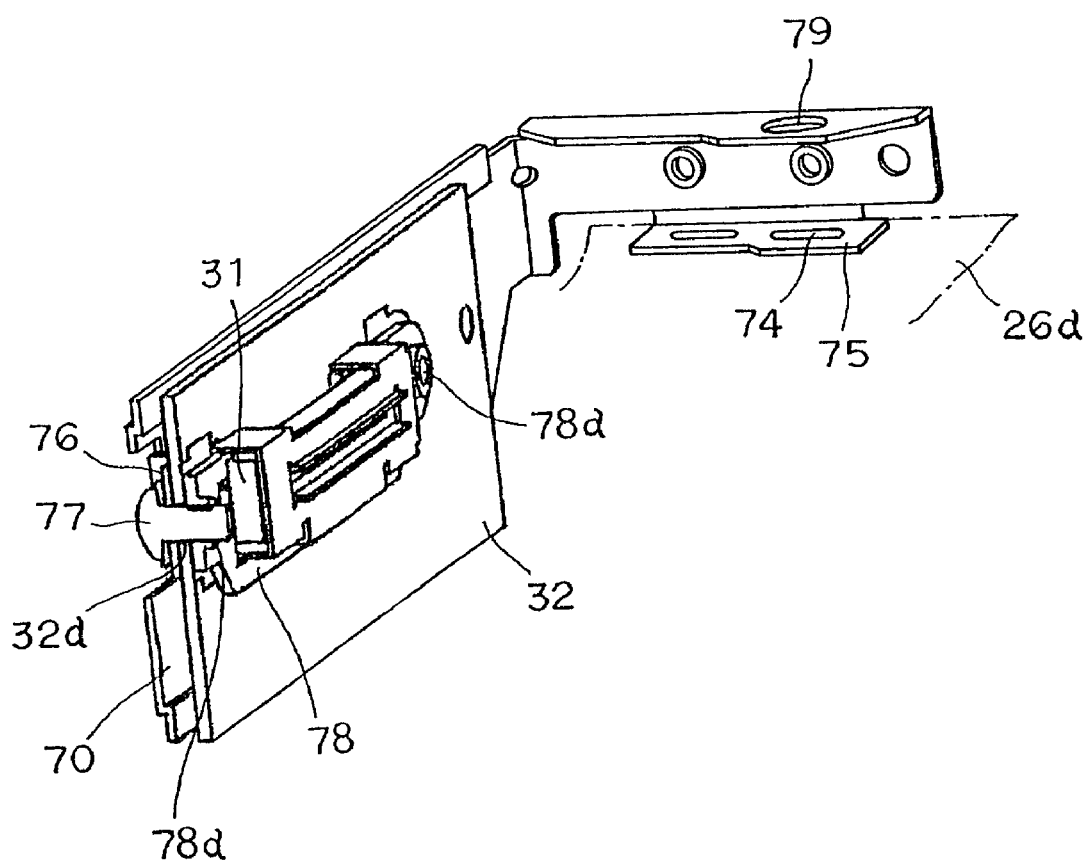
FIG. 9 is a perspective view showing the state that the sensor board equipped with the image sensor is attached to the shield member.
Figure 10:
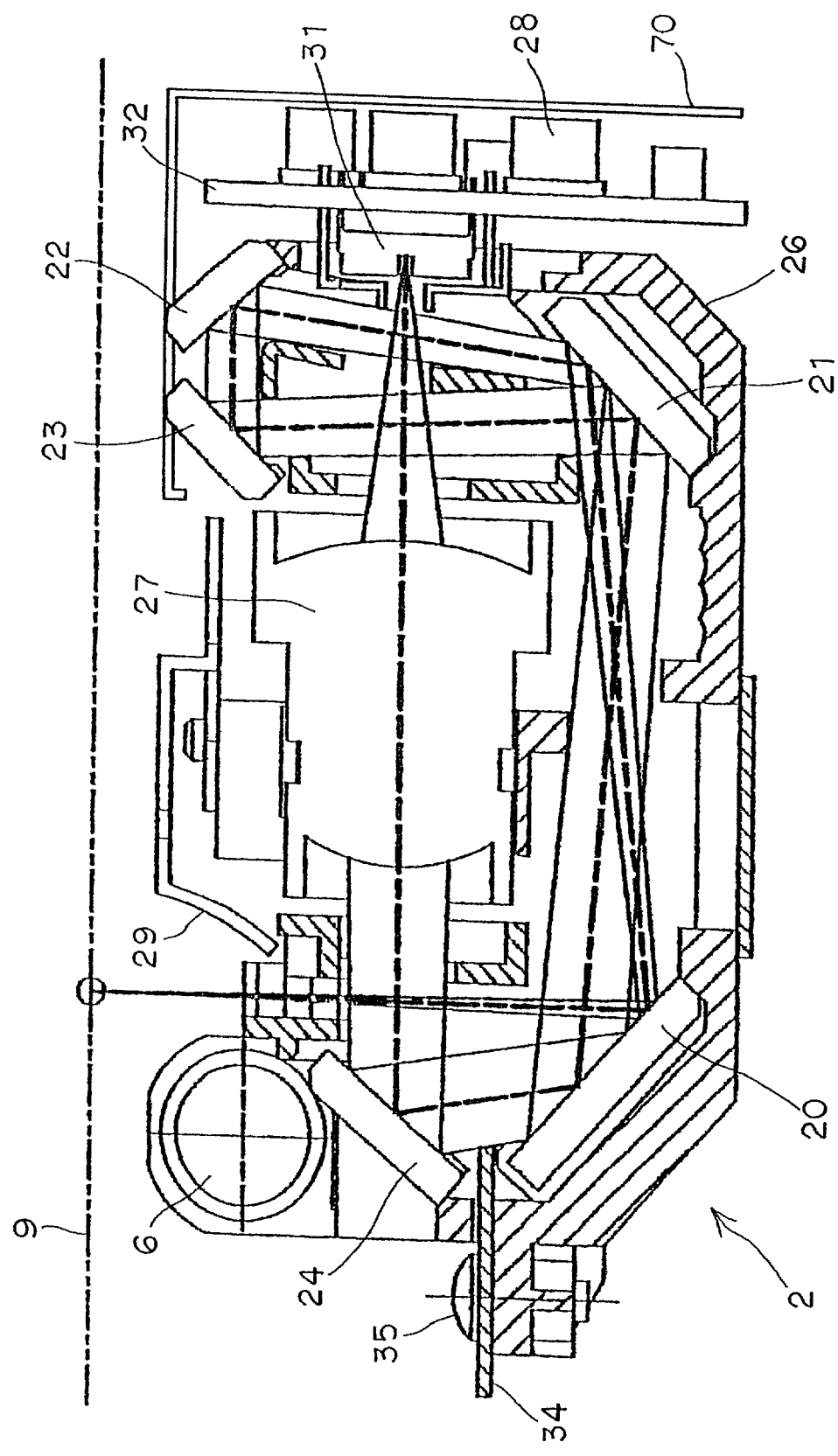
FIG. 10 is a sectional view showing a structure of the image reading unit for reading the image shown in FIG. 3.
Figure 11:
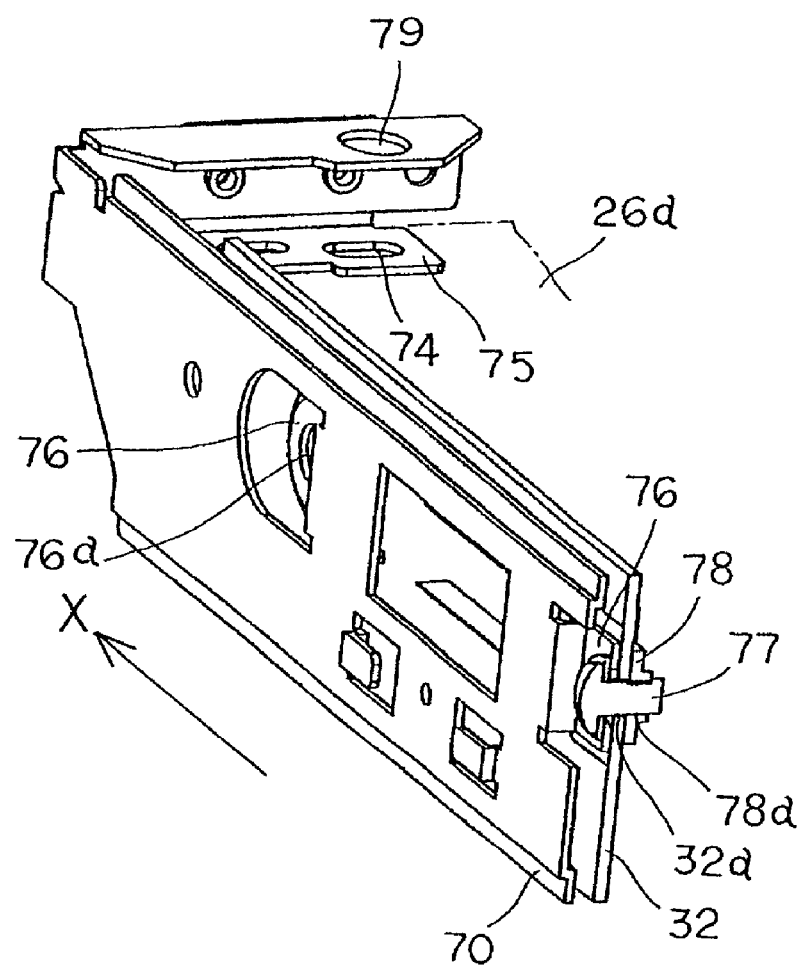
Figure 12:
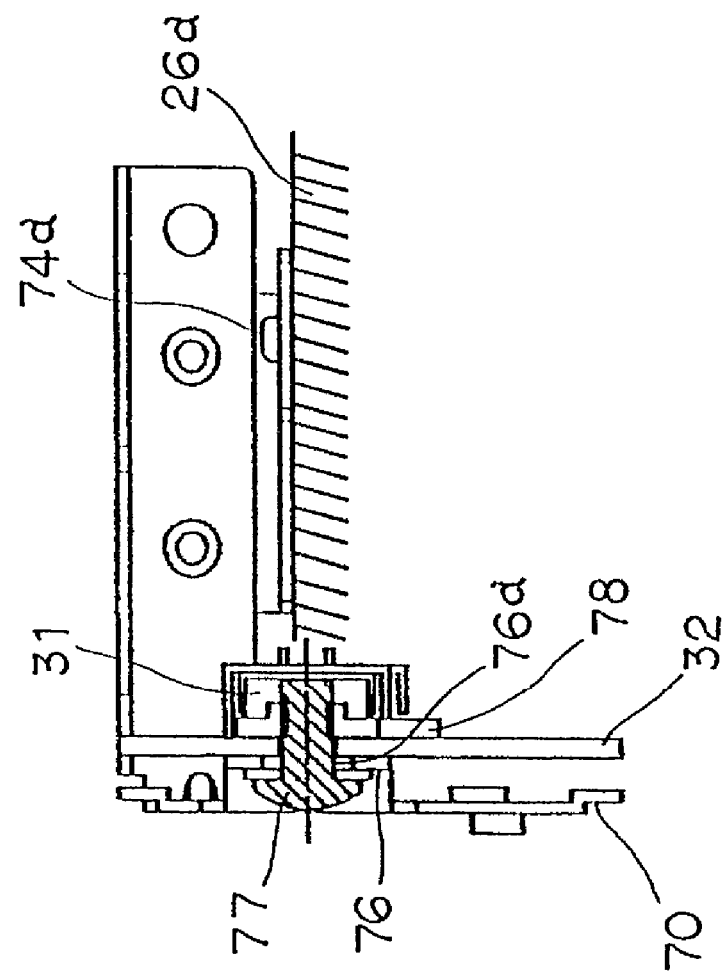
FIG. 12 is a side view of FIG. 11, as seen in a direction of an arrow X in FIG. 11.

FIG. 3 is a perspective view showing an image reading apparatus having a cover member 101 disposed on an upper surface of the main body frame 1 and a platen glass 9 for placing the document thereon. FIG. 4 is a plan view showing an inside structure of the image reading apparatus, and FIG. 5 is a perspective view showing the inside structure of the image reading apparatus in a state that the image reading unit 2 is at a home position. FIG. 6 is a perspective view of the image reading unit 2 as seen from a rear side in a state that the image reading unit is moving along a path while scanning the document image. FIG. 7 is another perspective view of the image reading unit 2 as seen from a front side in a state that the image reading unit is moving along a path while scanning the document image. Incidentally, an arrow A in FIGS. 5 to 7 indicates a moving direction of the image reading unit 2 when the image reading unit 2 reads the image on the document (a forward movement). FIG. 8 is a front view showing a sensor board 32 with an image sensor 31 attached to a shield member 70. FIG. 9 is a perspective view showing a sensor board 32 with an image sensor 31 attached to the shield member 70. FIG. 10 is a sectional view showing a structure of the image reading unit 2 for reading the image on the document. FIG. 11 is a perspective view seen from a direction opposite to the direction of the view in FIG. 9, and FIG. 12 is a side view of FIG. 11 as seen in a direction of an arrow X in FIG. 11.

The document is placed on the platen glass 9 disposed on the cover member 101 of the main body frame 1 shown in FIG. 3 such that the image surface of the document faces downward. As shown in FIGS. 4 and 5, below the platen glass 9, the image reading unit 2 is guided by a guide rod 3 and a guide rail 4, which are provided in the main body frame 1 as guiding means, and is driven by a stepping motor 5 connected through a driving belt 10 to slide along the platen glass 9 back and forth. Accordingly, the image reading unit 2 reads the image on the document while moving (the forward movement) in the direction shown by the arrow A in FIG. 5.

Here, in the image reading apparatus according to the embodiment of the invention, a configuration of the image reading unit 2 for reading the image on the document will be explained.

As shown in FIG. 10, the image reading unit 2 is provided with a mold frame 26. The mold frame 26 is provided with a light source 6, such as a xenon lamp, for irradiating light to the document; a reflecting plate 29 for reflecting the light from the light source 6 toward the surface of the document; reflecting mirrors 20, 21, 22, 23, 24 receiving the light from the document and providing the same in a horizontal direction; a lens unit 27 for condensing or focusing the light from the reflecting mirror 24; the image sensor 31, such as CCD, as an optical element for receiving the light focused by the lens unit 27; the sensor board 32 for mounting the image sensor 31; and a semiconductor 28 fixed on the sensor board 32. Incidentally, between the reflecting mirror 20 for reflecting the light first and the reflecting mirror 24 for reflecting the light last, a shooting plate 34 for averaging light intensity in an entire reading width is attached by a screw 35 such that the position of the shooting plate 34 can be adjusted. Also, as shown in FIG. 6, the light source 6 is disposed at one end of the image reading unit 2 in the forward movement direction. The shield member 70 provided with the sensor board 32 is fixed to the mold frame 26 of the image reading unit 2 at the other end of the image reading unit 2 in the forward movement direction.

Operations of reading the image on the document are performed as follows. First, the light reflected from the document in a vertical direction is irradiated to the reflecting mirror 20. Then, the light reflected from the reflecting mirror 20 in a substantially horizontal direction is reflected by the reflecting mirror 21 toward a substantially vertical direction. The reflecting mirror 22 receives the light reflected by the reflecting mirror 21 in the substantially vertical direction, and reflects the light in a substantially vertical direction toward a horizontal direction opposite to that of the reflected light from the reflecting mirror 20. The reflecting mirror 23 receives the light reflected by the reflecting mirror 22 in the horizontal direction, and reflects the received light toward a substantially vertical direction opposite to that of the reflected light from the reflecting mirror 21. The reflecting mirror 21 receives the light reflected from the reflecting mirror 23 in the substantially vertical direction, and reflects the received light toward a substantially horizontal direction opposite to that of the reflected light from the reflecting mirror 20.

The reflecting mirror 20 receives the reflected light from the reflecting mirror 21 in the substantially horizontal direction, and reflects the received light toward a substantially vertical direction opposite to that of the reflected light from the reflecting mirror 23 in a substantially vertical direction. The reflecting mirror 24 receives the light reflected by the reflecting mirror 20 in the substantially vertical direction, and reflects the received light toward a horizontal direction opposite to that of the reflected light from the reflecting mirror 21.

The light reflected from the reflecting mirror 24 enters the lens unit 27 to be focused, and the light focused by the lens unit 27 enters the image sensor 31 of an optical element.

The light detected by the image sensor 31 is converted into a digital signal by an analog-front-end device (hereinafter referred to as "AFE"), which is provided on the sensor board 32 to process the analog signal. The light converted into the digital signal is sent to an interface board in a higher level apparatus, such as a copier, through the control board 100 (refer to FIG. 4) that operates various types of image processing. As described above, the image reading apparatus is structured to create a clear and sharp image at a focal point of the lens by reflecting the image light several times.

In the image reading apparatus structured as described above, in order to prevent functional deterioration due to heat from the image sensor 31, it is necessary to dissipate the heat generated by the image sensor 31. Further, it is necessary to prevent electromagnetic waves radiated by a power supply and a cable from affecting the image sensor 31.

If the focal point of the lens unit 27 is not accurately located at the image sensor 31, which receives the light from the reflecting mirror 24, a fine image data can not be obtained. Therefore, in order to obtain the fine image data, it is required to be able to adjust the position accurately, and preferably the adjustment is easy. To achieve the goal, it is preferable that the number of parts for fixing the sensor board 32 to the attaching section is small.

Therefore, in the present embodiment, the sensor board 32 with the image sensor 31 is fixed to the shield member 70 that reduces the noise. The shield member 70 is fixed to an attaching section 26a (refer to FIGS. 11 and 12) attached to the mold frame 26 of the image reading unit 2 such that the position of the shield member can be freely adjusted.

The shield member 70 is made of a non-magnetic metal, such as a copper or aluminum, with high heat dissipating property, or a magnetic metal such as an iron or nickel.

As shown in FIG. 6, the shield member 70 is attached to the mold frame 26 of the image reading unit 2.

In the present invention, as shown in FIGS. 8 and 9, the image sensor 31 is attached to the sensor board 32a with a heat sink member 78 in between, which is provided for preventing over heat of the image sensor 31 and formed of a metal, such as a copper, aluminum, iron or nickel. Then, as shown in FIG. 11, a metallic screw 77 engages a screw hole 78a of the heat sink member 78 through a hole 76a formed at an outer attaching section 76 of the shield member 70, so that the sensor board 32 is fixed to the shield member 70.

Then, the heat conducted to the heat sink member 78 from the image sensor 31 through the screw 77 is further conducted to the shield member 70 to be dissipated. As described above, since the shield member 70 is formed of the member having the high heat dissipating property, such as a metal plate, the shield member 70 itself has a high heat dissipating property. Therefore, the shield member 70 can act as a heat sink to prevent the functional deterioration of the image sensor by dissipating the heat generated from the image sensor 31.

Also, as shown in FIGS. 11 and 12, a bracket 75 of the shield member 70 is provided with a mounting hole 74 for fixing the shield member 70 to the mold frame 26 of the image reading unit 2, and a screwdriver hole 79 facing the mounting hole 74. The mounting hole 74 is elongated in an optical axis direction such that the shield member 70 can be moved for adjusting the optical axis direction of the lens unit. The mounting hole 74 and the attaching section 26a of the mold frame 26 of the image reading unit 2 are connected by a connecting member 74a, such as a screw, so that the shield member 70 is fixed to the mold frame 26. Further, a screw driver can be inserted through a screwdriver hole 79 from above the image reading unit 2 to rotate the connecting member 74a, so that the position of the shield member 70 can be adjusted.

As shown in FIGS. 9, 11 and 12, regarding the heat sink structure, the heat sink member 78 is interposed between the image sensor 31 and the sensor board 32, and the image sensor 31 is fixed to the sensor board 32. Also, a heat conductive member, such as the metallic screw 77, is inserted into a through hole 32a of the sensor board 32 from outside the shield member 70, and is screwed with the screw hole on the heat sink member 78, so that the sensor board 32 is fixed to the shield member 70. Therefore, the heat, which is conducted to the heat sink member 78 from the image sensor 31, is conducted to the shield member 70 through the screws 77 and dissipated, to thereby prevent the image sensor 31 from over heating, as well as an influence of the heat on the sensor board 32.

Also, in adjusting the optical axis direction of the lens unit 27, if the connecting member is a screw, the fixed screw is loosened and the shield member 70 is shifted in a right or left direction of the mounting hole 74 for fine adjustment. As described above, since the image sensor 31 and the sensor board 32 are integrally fixed to the shield member 70, the adjustment can be made by just changing the mounting position of the shield member 70.

The shield member 70 and the attaching section 26a of the mold frame 26 of the image reading unit 2 are connected by a connecting member to secure the connection in an accurate position without any shifts. The attaching section 26a of the mold frame 26 in the image reading unit 2 is fixed to the bracket 75 of the shielding member 70 by a connection member, like a screw and a washer, so as not to be shifted.

Incidentally, in the present invention, the mounting hole 74 of the shield member 70 has a shape allowing the position adjustment. However, the mounting hole 74 of the shield member 70 may be a round hole in which the screw is inserted, and the attaching section of the mold frame of the image reading unit 2 may be a mounting hole having a shape that allows the position adjustment.

As shown in FIGS. 4 and 5, the image reading unit 2 of the embodiment as described above is guided by the guiding means (the guide rod 3 and the guide rail 4), and driven by the driving belt 10 connected to the stepping motor 5 to move back and forth. A light source cable 7 for supplying an electric power to the light source 6 and a signal cable 8 for transmitting the input/output data of the sensor board 32 are connected to the image reading unit 2. Since the light source cable 7 carries a high voltage current, a flexible electric wire is used for the light source cable. A flexible flat cable is used for the signal cable 8.

Now, the signal cable 8 will be explained.

Figure 13:
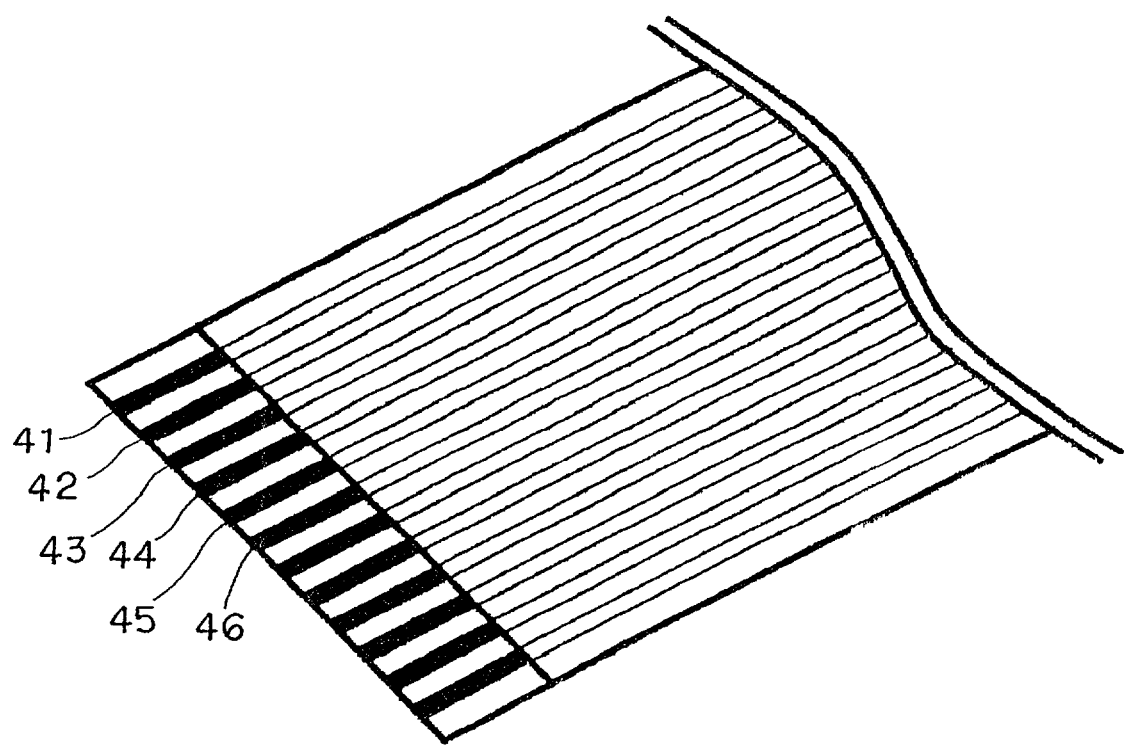
FIG. 13 is a perspective view showing a state of conductors inside a flexible flat cable.
Figure 14:
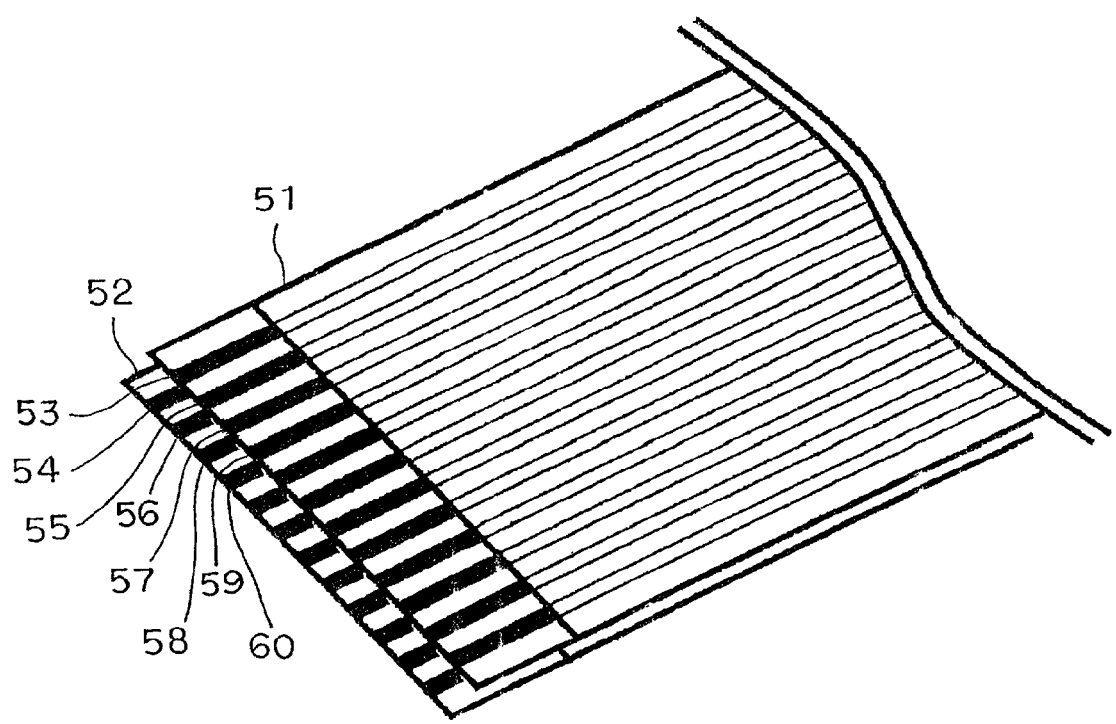
FIG. 14 is a perspective view showing a state of conductors inside a layered flexible flat cable.
Figure 15:
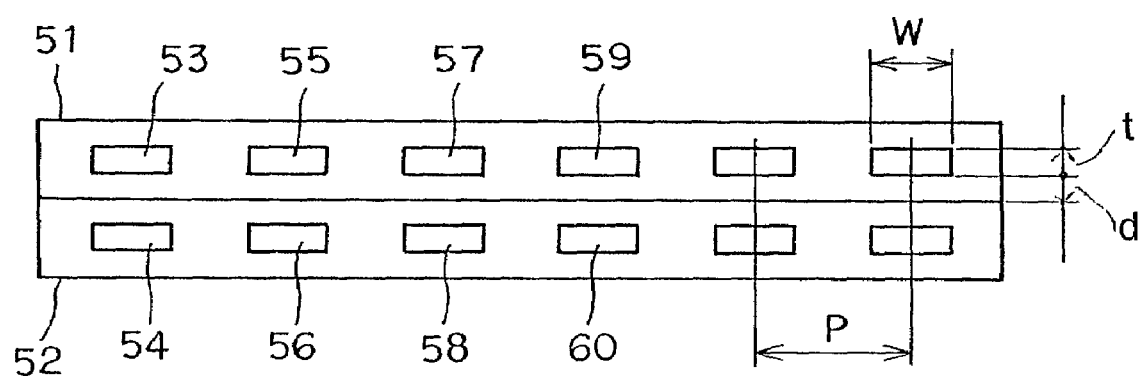
FIG. 15 is a sectional view of the layered flexible flat cable.
Figure 16:
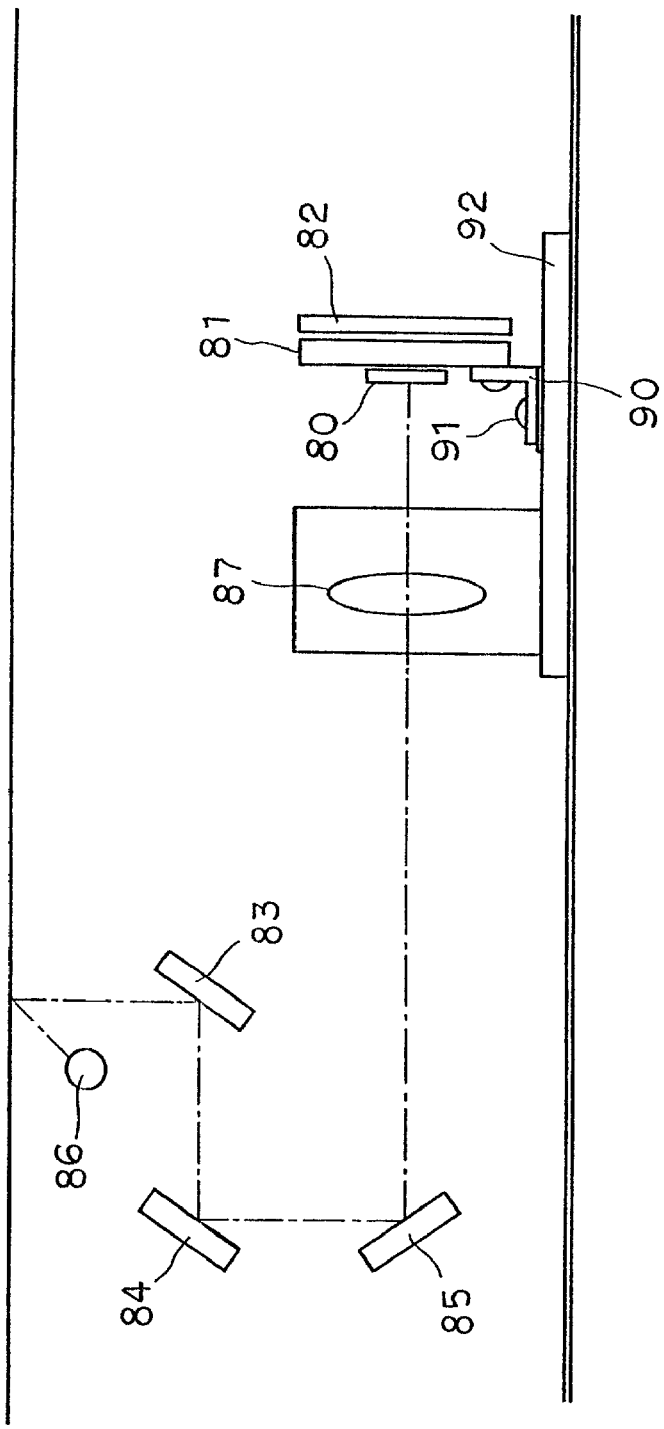
FIG. 16 is a schematic explanatory view showing a conventional image reading apparatus.

FIG. 13 is a perspective view showing conducting paths inside the signal cable 8. FIG. 14 is a perspective view showing a state that the signal cables 8 are layered. FIG. 15 is a sectional view of the layered signal cable 8.

The signal cable 8 is formed of a flexible flat cable (hereinafter referred to as "FFC") in which an input cable and an output cable are laminated and integrally formed. The signal cable 8 is provided for wiring between the sensor board 32 and the control board 100 to thereby send and receive the signal. In the case that the AFE is provided in the sensor board 32 as in the embodiment of the invention, the signals transmitted through the FFC are the control signal for the image sensor 31 and AFE and the digital output signal from the AFE. In the case that the AFE is provided in the control board 100, the signals transmitted through the FFC are the control signal for the image sensor 31 and the analog output signal from the image sensor 31. A long FFC is used for wiring between the boards 32 and 100, since these boards are separated and the image reading unit moves back and forth. A FFC used for the signal cable 8 has a width of about 30 mm, and signal paths and ground paths are arranged side by side.

In the FFC, a copper foil is used as a conducting member, which is covered by a non-conductive resin, such as a polyimide. Also, as a reinforcement, a polyester film is attached to a rear surface of the FFC, and a thickness of the polyester film is in a range from about 0.05 mm to 0.6 mm, and the polyester film is about 0.6 mm in thickness in the embodiment. The FFC is not rigid, thus the vibration due to a motion of the cable itself is unlikely to be transmitted to other devices. For this reason, the FFC has been used as the signal cable in the image reading apparatus.

Since a large number of the signals described above are created at a frequency in a range of several MHz to several tens MHz, harmonic a little higher than the signal has a shorter wavelength. When a wavelength is equal to a length of the FFC, a resonance occurs. When several tens percent of the wavelength becomes less than the length of the FFC, a high-level electromagnetic noise is generated.

As a method for preventing the electromagnetic field, it has been known that a return path of a reflux current and the signal path are paired and close to each other so as to minimize a loop area of the return path. Alternatively, a shield member covering the entire surface of the FFC as a ground point can prevent the electromagnetic field. However, in the image reading apparatus of the embodiment, such a shield member deteriorates bending durability and increases a cost, thus is not practical.

As shown in FIG. 13, in a conventional method of arranging the signal paths in the FFC, the signal paths and the ground paths are arranged alternately such that conductors 41, 43, 45, . . . constitute the signal paths (the signal lines), and conductors 42, 44, 46, . . . constitute the ground paths (the ground lines). Accordingly, the return paths, that are a pair of the signal paths and ground paths, are disposed close to the respective signal paths, to thereby reduce the loop area.

This method is effective for EMC (Electromagnetic Compatibility) with respect to the flat cable, such as FFC. In the case that the number of the paths in the FFC is limited, every two signal paths are arranged to have one ground path alternately. In other words, each ground path is arranged at an interval of two adjacent signal paths, such that the conductors 41, 42, 44, 45, . . . constitute the sending paths (the signal lines), and the conductors 43, 46, . . . constitute the ground paths (the ground lines). Accordingly, the EMC can be improved.

Further, in the image reading apparatus of the embodiment, in order to provide a more effective EMC countermeasure, as shown in FIG. 14, a plurality of the FFC, for example, a FFC 51 and a FFC 52 are laminated. In the FFC 52, the signal paths and the ground paths are shifted such that conductors 53, 56, 57, 60, . . . constitute the signal paths (the signal lines), and conductors 54, 55, 58, 59, . . . constitute ground paths (the ground lines). In this case, the signal lines and ground lines are alternately opposed to each other between the FFC 51 and the FFC 52 in at least a part of the cable lines FFC 51 and FFC 52. Therefore, the number of the ground paths adjacent to the signal paths is increased.

Accordingly, the configuration described above makes it possible to reduce the number of the ground paths in the FFC to thereby reduce the width of the FFC. If the signal paths and ground paths are arranged in a conventional way, the signal paths in the FFC 51 and the signal paths in the FFC 52 would be in the same rows. However, in the embodiment, the signal paths in the FFC 51 and the signal paths in the FFC 52 are shifted with each other, and the ground paths in the FFC 51 and the ground paths in the FFC 52 are shifted with each other. Accordingly, the returns paths are created close to the signal paths between the FFCs.

As a result, the magnetic flux is reduced more effectively, to thereby further prevent the magnetic field from being generated. Also, a characteristic impedance of the conductor can be improved, so that the EMC performance can be improved, and signal distortion can be reduced.

As shown in FIG. 15, the FFC has a width of the conductor W, a thickness of the conductor t, a thickness of the insulation d and a pitch p. In this case, in addition to the ground path at a distance (p–W) with a width d, the ground path is positioned at a distance (2×d) with a width W. For example, the ground path 55 has the distance (p–W) and width t with respect to the signal path 53 in the FCC 51. In addition, the ground path 54 in the FCC 52 has the distance (2×d) and the width W with respect to the signal path 53.

As an example of the image reading apparatus, a FCC with the conductor width 0.6 mm, the conductor thickness 0.1 mm, the insulation thickness 0.1 mm, and the pitch 1 mm is used to connect the image sensor board and the control board 100. In this case, the signal path and the ground path in the same FCC are situated with a distance 0.4 mm and a width 0.1 mm. The signal path and the ground path in the different FCCs are situated with a distance 0.2 mm and a width 0.6 mm. In other words, in the flat cables, the distance between the paths in the different FCCs is shorter than that in the same FCC.

Therefore, the ground path can be disposed much closer to the signal path. Since a return current flows selectively in the path closest to the signal path, in the case of using the laminated FFC, the return current from the signal path in one FFC flows the path in the other FFC. Accordingly, the loop area is effectively reduced to prevent the electromagnetic field generated from the FFC. At the same time, the characteristic impedance of the conductor can be improved, so that the EMC performance can be improved, and the signal distortion can be reduced.

Also, in the case that the AFE is disposed in the image sensor board, as more than 30 sending and receiving signals are transmitted between the image sensor board and the control board 100, the FEC needs to have a little over 30 mm width to accommodate more than 30 paths. In case that the AFE is not disposed in the image sensor board, as more than 10 sending and receiving signals are transmitted between the image sensor board and the control board 100, the FEC needs to have a little over 10 mm width for more than 10 paths to improve the EMC. Incidentally, the thickness of this FCC becomes double, about 0.6 mm.

Also, as another example, a FCC with the conductor width 0.3 mm, the conductor thickness 0.05 mm, the insulation thickness 0.1 mm, and the pitch 0.5 mm is used to connect the image sensor board and the control board 100. In this case, the signal path and the ground path in the same FCC are situated with a distance 0.2 mm and a width 0.05 mm. The signal path and the ground path in the different FCCs are situated with a distance 0.2 mm and a width 0.3 mm. Accordingly, the ground path can be disposed much closer to the signal path.

Since the return current flows selectively in the path closest to the signal path, in the case of using the laminated FFC, the return current from the signal path in one FFC flows the path in the other FFC. Accordingly, the loop area is effectively reduced to prevent the electromagnetic field from being generated from the FFC. At the same time, the characteristic impedance of the conductor can be improved, so that the EMC performance can be improved, and the signal distortion can be reduced. The level of emitting the electromagnetic noise can be reduced lower than a predetermined level.

Also, in the case that the AFE is disposed in the image sensor board, as more than 30 sending and receiving signals are transmitted between the image sensor board and the control board 100, the FEC needs to have a little over 15 mm width to accommodate more than 30 paths. In case that the AFE is not disposed in the image sensor board, as more than 10 sending and receiving signals are transmitted between the image sensor board and the control board 100, the FEC needs to have a little over 5 mm width for more than 10 paths to improve the EMC. Incidentally, the thickness of this FCC becomes double, about 0.6 mm.

As described above, in the embodiment of the invention, the signal cable is formed of a plurality of flat cables, and the signal paths and the ground paths in the cables are arranged such that each signal path in the laminated flat cables is surrounded by the ground paths.

Accordingly, the level of emitting the electromagnetic noise can be reduced to a predetermined level or less, and the image data read by the image sensor is not distorted in the image reading apparatus of the invention.

Now, an arrangement of the light source cable 7 to be connected to the image reading unit 2 and the signal cable 8 described above will be explained.

The light source cable 7 connected to the light source 6 and the signal cable 8 connected to the sensor board 32 are respectively drawn from both end sides of the image reading unit 2 in a direction perpendicular to the moving direction of the unit toward opposite directions.

As shown in FIG. 4 and FIG. 7, the light source cable 7 extends from the light source 6 to the central portion of the guide rod 3, and is connected to a power supply 12 through light source cable fixing means 11, such as a metal binding, provided in the central portion of the guide rod 3. One end of the light source cable 7 is bent in a U-shape and connected to the light source 6 from a rear end of the image reading unit 2 in the scanning direction.

The light source 6 is a discharge type and an elongated rod-like light source, and a high voltage (a several thousands volt) is applied thereto. Accordingly, the light source cable 7 has a thick cover to withstand the high voltage.

As shown in FIG. 7, the light source cable 7 is drawn toward the rear side of the image reading unit 2 in the moving direction (the direction of arrow A in the figure). When the image reading unit 2 is moved to read the image on the document, the light source cable 7 is accompanied with the image reading unit 2 with shifting a bent point of the U-shaped portion.

The signal cable 8 structured as described above is drawn from the sensor board 32 toward the moving direction through a backside of a light source support section 13 as shown in FIG. 7. The signal cable 8 drawn from the unit 2 is accompanied with the image reading unit 2 when the unit 2 is moving. Incidentally, as shown in FIG. 8, the signal cable 8 is pressed and fixed by the guide rail 4 at the central portion of the moving range of the image reading unit 2. When the image reading unit 2 is moved to read the image on the document, the signal cable 8 is moved in the moving direction of the unit with the image reading unit 2. The signal cable 8 is moving from a signal cable fixed portion 8a at the central portion of the moving range of the image reading unit 2 with shifting a bent point of a U-shaped portion.

At this time, the bent point of the U-shaped portion of the cable 8 shifted by the movement is held by the light source support section 13 so as to keep the cable from touching the platen glass 9.

Then, as shown in FIG. 7, the signal cable 8 is drawn from the sensor board 32 in the moving direction under the light source support section 13. Thus, the light source support section 13 can hold the bending point of the cable 8 when the image reading unit 2 is moved to read the image on the document.

Since the signal cable 8 is pressed and fixed by the guide rail 4 at the center portion of the main body frame 1 of the image reading apparatus, on which the image reading unit 2 is placed, the length of the signal cable 8 can be a half of the distance in which the image reading unit 2 is moved for reading the image. Therefore, the length of the signal cable 8 can be shortened, and a load applied to the image reading unit 2 with moving back and forth can be reduced. Also, it is unlikely for the signal cable 8 to loosen to cause a problem. Further, since the length of the signal cable 8 is relatively shorter, it is harder to be affected by the noise.

Here, the light source cable 7 is drawn from the image reading unit 2 toward the rear side in the moving direction (the direction of the arrow A) of the unit 2, and bent in the U-shape. Then, the light source cable 7 is supported by the fixing means 11, and the bent point of the light source cable 7 is gradually shifted as the image reading unit 2 is moved to scan the image. If the light source cable 7 is not flexible, the bent point of the cable becomes large, so that the cable 7 touches the platen glass 9, resulting in causing wear of the cable. Also, the movement of the image reading unit 2 is impaired.

Therefore, in the present invention, the direction of drawing out the light source cable 7 is arranged to be opposite to that of the signal cable 8. The light source cable 7 is drawn out from the unit 2 in the direction opposite to the scanning direction (direction of the arrow A) of the image reading unit 2, and bent in the U-shape at the rear side of the image reading unit 2.

Since the bent point of the light source cable 7 is located at the rear side of the image reading unit 2 in the moving direction of the image reading unit 2, the bent point of the cable 7 is pressed by the image reading unit 2, to thereby prevent from enlarging. Therefore, the aforementioned problems due to an enlarged bent point can be prevented.

The arrangement of the light source cable 7 and the signal cable 8 of the image reading unit 2 has been explained. In order to read an accurate image, it is necessary to move the image reading unit 2 accurately.

Namely, as described above, the light source cable 7 is drawn from the image reading unit 2 to the rear side in the moving direction (the direction of the arrow A), and bent in the U-shape and fixed by the fixing means 11. When the image reading unit 2 is moved to scan, the bent point is gradually shifted in the light source cable 7. If the light source cable 7 is not flexible, the bent point becomes large, thus the light source cable 7 touches the platen glass 9, interfering the movement of the image reading unit 2.

Also, in the case that the light source cable 7 is located at only one side with respect to the moving direction of the image reading unit 2, the load to the image reading unit 12 is different from the other side, so that the moving speed is changed respectively at each side to cause an uneven image.

To prevent this, there is an example that the light source cable 7 is divided into a plurality of cables, and they are disposed at both right and left sides with respect to the central portion of the image reading unit 2. In this example, the drawing out direction of the respective cables from the image reading unit 2 is the same. In the case that the cables having a different thickness, or a different stiffness are used, a curvature of the U-shaped bent portion of the cable on the right side is different from that of the cable on the left side, so that the resistance against the reading unit is different, resulting in an unstable moving speed.

Thus, in the present invention, the direction of drawing out the light source cable 7 from the unit 2 is arranged to be opposite to that of the signal cable 8, to thereby eliminate the aforementioned problem, that is, the unstable moving speed. The light source cable 7 is drawn out from the image reading unit 2 in the direction opposite to the moving or scanning direction of the image reading unit 2, and is bent in the U-shape at the rear side of the moving direction of the image reading unit 2

The signal cable 8 passes through a side under the light source 6 of the image reading unit 2, and is drawn out in the moving direction of the image reading unit 2. Then, the signal cable 8 is bent in the U-shape at a forward side of the fixed section 8a provided at the central portion of the moving range of the image reading unit 2 in the moving direction.

As described above, the position and the direction of the bent point of the cables are opposite to each other, so that the running load applied to the image reading unit 2 is spread. Then, since the respective cables are disposed away from each other at the both end sides of the image reading unit 2, radio wave noises from them do not affect with each other.

Also, the signal cable 8 is connected to the control board 100 extending from the fixed section 8a at the central portion of the moving range of the image reading unit 2, obliquely crossing through the frame 1, and crossing the light source cable 7. As described above, since the signal cable 8 crosses perpendicularly to the light source cable 7, the signal cable 8 is not affected by the noise emitted from the light source cable 7.

Furthermore, the signal cable 8 and the light source cable 7 are fixed at the central portion of the moving range of the image reading unit 2. Since both the cables are connected from the fixed connection portions of the image reading unit 2, the length of each cable is about a half of the moving range of the image reading unit 2. According to the structure of the cables in the invention, since the length of the cable accompanied with the movement of the unit is relatively short, the load applied to the movement of the unit can be minimized.

Also, since the length of the cable is short, when the bent portions of the signal cable 8 and the light source cable 7 are shifted in the cables 7 and 8 as the image reading unit 2 is moved, the signal cable 8 and the light source cable 7 are not twisted. Also, the bent portions are prevented from expanding upwardly.

As described above, in the present embodiment, the light source is disposed at one end in the moving direction of the reading unit, and the image sensor is disposed at the other end. In addition, the light source cable connected to the light source and the signal cable connected to the image sensor are respectively drawn from two different ends. Therefore, the running load between right and left sides of the moving direction of the image reading unit can be balanced. Further, the light source cable and the signal cable are drawn from the directions opposite to each other along both ends of the moving direction of the unit, to thereby maintain the load balance between the left and right sides of the moving direction of the unit. Accordingly, the image reading unit and the image reading apparatus can achieve the high-density and high-speed image reading.

Further, in the image reading apparatus of the invention, since the signal cable 8 and the light source cable 7 are disposed away from each other at both sides of the main body frame, the electric wave emitted from the one cable does not interfere with the other, and the signal cable 8 is not effected by the electric wave hindrance, such as noises.

Also, the signal cable 8 is drawn from the main body frame to cross perpendicular to the light source cable 7. Thus, the radio waves from the cables do not interfere with each other.

As described above, in the image reading unit 2 of the invention, the shield member 70 equipped with the image sensor 31, the heat sink member 78, and the sensor board 32 is provided with the bracket 75. The mounting hole 74 formed on the bracket 75 and the attaching section 26a of the mold frame 26 of the image reading unit 2 are fixed by the connecting member 74a such that the position thereof can be freely adjusted.

As described above, the shield member 70 for fixing the sensor board 32 to the image reading unit 2 reduces the noise, and also acts as the heat sink for dissipating the heat generated from the image sensor 31. Therefore, the number of parts can be reduced, and a manufacturing cost can be lowered.

While the invention has been explained with reference to the specific embodiments of the invention, the explanation is illustrative and the invention is limited only by the appended claims.

What is claimed is:

1. An image reading unit for reading an image on a document, comprising:
   a light source for irradiating light to a document,
   a plurality of mirrors for reflecting the light irradiated from the light source and reflected at the document,
   a lens for focusing the light reflected by the mirrors,
   an image sensor for receiving the light from the lens and converting the same into an electric signal,
   a heat dissipating member for dissipating heat of the image sensor,
   a circuit board having an outer side and an inner side, said image sensor and the heat dissipating member being attached to the inner side, a shield member disposed on the outer side of the circuit board to be located at an outermost side of the image reading unit for reducing a noise relative to at least one of the image sensor and the circuit board, a heat conductive member situated between the heat dissipating member and the shield member to transfer the heat from the heat dissipating member to the shield member, said heat conductive member integrally uniting the circuit board, image sensor, heat dissipating member and shield member together as one sensor unit, and a frame for integrally supporting the light source, the mirrors, the lens and the one sensor unit, wherein said shield member includes a center portion to which the circuit board, the image sensor and the heat dissipating member are attached through the heat conductive member, and bent portions located on two lateral sides of the center portion and extending toward the image reading unit, said bent portions being adjustably connected to the frame so that said one sensor unit can be adjustably positioned along a light path entering into the image sensor.

2. An image reading unit according to claim 1, wherein said heat dissipating member is interposed between the image sensor and the circuit board.

3. An image reading unit according to claim 1, wherein one of said mirrors is fixed between the two bent portions, said bent portions being fixed to the frame outside said one of said mirrors.

4. An image reading unit according to claim 1, wherein said plurality of mirrors comprises a last mirror disposed at a side opposite to the image sensor relative to the lens, reflecting the light from the document to the image sensor and forming a linear light path relative to the image sensor passing through the lens;

reflecting mirrors disposed between the lens and the image sensor and forming light paths reflecting the light back and fourth, said light paths intersecting said linear light path between the lens and the image sensor; and a first mirror located at an incident side of the lens, reflecting the light from the document to the reflecting mirrors and reflecting the light from the reflecting mirrors to the last mirror, and wherein said bent portions are located outside the reflecting mirrors and are fixed to the frame.

5. An image reading unit according to claim 4, wherein said reflecting mirrors include a second mirror located at a side of the first mirror and receiving the light from the first mirror, a third mirror facing the second mirror with the linear light path interposed therebetween and receiving the light from the second mirror, and a fourth mirror located at a side of the third mirror and reflecting the light from the third mirror back to the second mirror, and wherein one of said bent portions is located outside the third and fourth mirrors adjacent thereto and fixed to the frame.

6. An image reading unit according to claim 5, wherein said circuit board is provided with a through hole, and said heat conductive member passes through the through hole of the circuit board to thereby connect the heat dissipating member and the shield member.

7. An image reading unit according to claim 1, wherein the light source is located at an end of the image reading unit at a side opposite to the shield member.

8. An image reading unit according to claim 1, wherein each of the bent portions has a through hole allowing a fixing member for fixing the bent portion to the frame from an upper side.

9. An image reading apparatus comprising a platen for placing a document, and an image reading unit according to claim 1, said image reading unit being supported to be movable along the platen for reading the document.

* * * * *